United States Patent [19]
Braggs et al.

[11] Patent Number: 6,071,335
[45] Date of Patent: Jun. 6, 2000

[54] SURFACE MODIFICATION OF KAOLINITE

[75] Inventors: Belinda Braggs, Prospect; John Ralston, Belair; Roger St. Clair Smart, Mount Osmond, all of Australia

[73] Assignee: Comalco Aluminium Limited, Melbourne, Australia

[21] Appl. No.: 08/849,042

[22] PCT Filed: Nov. 27, 1995

[86] PCT No.: PCT/AU95/00782

§ 371 Date: Aug. 12, 1997

§ 102(e) Date: Aug. 12, 1997

[87] PCT Pub. No.: WO96/17021

PCT Pub. Date: Jun. 6, 1996

[30] Foreign Application Priority Data

Nov. 25, 1994 [AU] Australia .................... PM 9671

[51] Int. Cl.⁷ ........................................... C09C 1/42
[52] U.S. Cl. .................... 106/416; 106/486; 106/487; 428/403; 428/405; 427/212; 427/215; 427/213.31; 427/220; 427/248.1; 427/255.6; 427/535; 427/569

[58] Field of Search .................... 106/416, 486, 106/487; 428/403, 405; 427/212, 213.31, 215, 248.1, 255.6, 535, 569, 539, 220

[56] References Cited

U.S. PATENT DOCUMENTS

| | | | |
|---|---|---|---|
| 3,660,134 | 5/1972 | Morris et al. | 106/308 Q |
| 3,697,474 | 10/1972 | Morris et al. | 260/40 |
| 4,080,284 | 3/1978 | Mitchell | 502/263 |
| 5,234,723 | 8/1993 | Babacz | 427/491 |

FOREIGN PATENT DOCUMENTS

| | | |
|---|---|---|
| 59425/73 | 2/1975 | Australia . |
| 63-030407 | 2/1988 | Japan . |

*Primary Examiner*—Michael Marcheschi
*Attorney, Agent, or Firm*—Seed Intellectual Property Law Group PLLC

[57] ABSTRACT

A method for modifying the surface of kaolinite or a kindred mineral comprises the step of subjecting the mineral to a water vapor plasma. The modification involves the generation of reactive hydroxyl sites on the surface of the kaolinite. The plasma treatment may be followed by treatment with an appropriate chemical reagent to further modify the surface properties of the mineral.

8 Claims, 10 Drawing Sheets

SURFACE MODIFICATION OF KAOLINITE

CROSS-REFERENCE TO RELATED APPLICATION

The present application claims priority from Australian Patent Application No. PM9671/94, filed Nov. 25, 1994, which application is incorporated herein by reference in its entirety.

TECHNICAL FIELD

This invention relates to the surface modification of clay minerals, particularly the plate-like clay minerals and especially (but not exclusively) kaolinite. The invention is especially concerned with the surface modification of such minerals by the use of a water vapour plasma.

BACKGROUND OF THE INVENTION

Kaolinite is a common mineral, the chief constituent of kaolin or clay. It is a member of the clay mineral group of phyllosilicates which group also includes talc (or soapstone) and pyrophyllite. Clay minerals similar to kaolinite include dickite, nacrite, anauxite, halloysite, montmorillonite (dominant clay in bentonite), beidellite, nontronite, hectorite, saponite, and illite. Clay minerals similar to talc include minnesotaite. All of these minerals are referred to herein as "kaolinite and kindred minerals".

[References (indicated by bracketed numbers) are listed at the end of description.]

Kaolinite has a wide variety of applications in industry, particularly as a paper filler and a coating pigment (5). It is used as an extender in aqueous based paints and ink, a functional additive in polymers and is the major component in ceramics (5). Kaolinite is an inexpensive additive which can improve the properties of the material in which it is dispersed, provided it is able to form stable dispersions. In order to achieve this the surface is usually modified in some way so as to enhance colloid stability in a system whether it be organic, as for polymers, or in aqueous dispersions.

The surface of kaolinite, like other clay minerals, is relatively inert, unlike silica and many other minerals. Kaolinite has two different basal cleavage faces. One face consists of a siloxane surface with very inert —Si—O—Si— links. The other basal surface consists of an octahedral, gibbsite [$Al(OH)_3$] sheet. Both of these surfaces are theoretically electrically neutral. At the edges of a platelet and at the surface ridges the lattice is disrupted and broken bonds occur which are accommodated as OH groups. These edges have been estimated to occupy approximately 10% of the whole kaolinite surface (6).

The hydroxyl groups at the plate edges are considered to be the major reactive sites of clay surfaces including kaolinite (1). Rigorous conditions are required to modify the surface of clay minerals including the use of anhydrous solvents, fluidised beds or autoclaves, the use of coupling agents, encapsulation by polymer synthesised on the surface or adsorption of surfactants from aqueous suspensions (7, 8, 9). Some of these methods are time consuming, polluting and of high cost and often the adhesion between the kaolinite particles and the modifying chemical is not strong as they are not covalently bound over the whole surface but either electrostatically bound or encapsulated (i.e. sheathed) and only bound covalently at the edges of the kaolinite particles. This can mean that the modifying chemical on the surface of kaolinite may not remain attached under certain conditions, (eg. during processing of the polymer into which it has been dispersed) causing the dispersion to become unstable. Methods, such as acid hydrolysis, have been attempted in the past to increase the reactivity of clays, including kaolinite, but these have been unsuccessful on kaolinite (1).

SUMMARY OF THE INVENTION

The present invention is directed to a method for modifying the surface properties of kaolinite or a kindred mineral. The method includes the step of subjecting the kaolinite or kindred mineral to water vapor plasma.

In another aspect, the invention provides a kaolinite or kindred mineral having a modified surface. The modified surface contains additional reactive hydroxyl sites.

DETAILED DESCRIPTION OF THE INVENTION

We have now found that the surface of kaolinite can be modified using a water vapour plasma discharge (e.g. produced by a cold radio-frequency discharge). This increases the reactivity of the surface by increasing the number of reactive surface hydroxyl sites, which are now thought to be located over the entire surface of kaolinite, that is, the basal planes and the edges, not just the edges as is thought to be the case with unmodified kaolinite. The extent of this modification and therefore the increase in the number of reactive surface hydroxyl groups on the surface can be controlled by such factors as flow rate and temperature of gas, power, reaction time, frequency and pressure in the plasma reactor as well as the configuration of the electrodes. The surface of kaolinite can be further modified after plasma modification by chemical reagents which react with surface hydroxyl groups, such as organosilanes, alcohols etc. and by chemical reagents which adsorb on to the charged surface when kaolinite is immersed in aqueous solutions.

The surface properties of kaolinite can be controlled by these modification methods to produce a range of surface properties, from hydrophilic to hydrophobic. Water vapour plasma modification increases the surface charge development of the kaolinite surface in aqueous dispersions and thereby increases the hydrophilicity and hence dispersion stability in aqueous solutions. Water vapour plasma modified surfaces, when subsequently reacted with organic reagents such as monochlorosilanes give rise to surfaces which are hydrophobic over the entire surface. Kaolinite thus treated will not disperse in water, whereas kaolinite which has not been plasma modified is still dispersible in aqueous media after reaction with monochlorosilanes. This behavior indicates that in the case of the unmodified (i.e. non-plasma reacted) kaolin, the organosilane has reacted with only part of the surface, the edges only and that little or no organosilane reaction occurs on the basal planes.

Water vapour plasma modification thus has enormous implications for improving the interaction between kaolinite and chemical reagents already in use (2, 3 and 4). This in turn has significant implications for industries that use kaolinite and need to improve its dispersibility in either aqueous or organic media. This includes the paper industry, which is the major use of kaolinite, and the polymer, paint and rubber and ceramic industries.

Plasma modification of mineral surfaces in general is known and is becoming a more widely used method, due to the following apparent advantages (8,10):

1. it is a simple and dry method, requiring no contact of the solid with water or other suspending liquids hence it is much less polluting than when solvents are used. Further, the hazard of adding agents, which may be deleterious to strong interfacial adhesion, is thereby avoided.
2. the extent of surface modification can be controlled.
3. the degree of modification is relatively uniform over the surface.
4. the bulk properties of the substrate are not changed significantly.

There has been no published work which shows that kaolinite has been or can be modified by a water vapour plasma discharge, or indeed by any other method, successfully to increase the reactivity over the entire surface in a controlled manner, that is, with respect to the basal planes as well as the edges. Published work (12, 13, 14, 15, 16, 17) indicates that other minerals and pigments have been modified by a plasma, but does not show modification of kaolinite or kindred minerals by a water vapour plasma.

Kiss and Gölander (Reference 15) describe modification of the surface of mica by a water vapour plasma followed by silylation. Their experiments were carried out on individual sheets of mica, principally for the purpose of producing samples for use in surface force measurement apparatus. Kiss and Gölander did not address the possibility of modifying mica (or any other mineral) in powder form in a reproducible manner.

Additionally, it should be noted that mica is naturally a hydrophilic material, whereas kaolinite is hydrophobic. Thus results obtained by plasma modification of mica are not necessarily applicable to kaolinite.

According to one aspect of the present invention there is provided a method for modifying the surface properties of kaolinite or a kindred mineral which comprises the step of subjecting the mineral to a water vapour plasma.

The nature and extent of the surface modification is controlled by a number of factors including the configuration of the apparatus used, the power and frequency of the energy input to the plasma, the partial pressure and flow rates of the water vapour and the treatment times. Selection of the best combination(s) of these parameters for a particular kaolinite source material will generally need to be determined by experiment and will also depend in part on the kaolinite source material used and the intended use of the modified kaolinite, e.g. the further treatment as described below.

The reactive surface hydroxyl sites generated by a water vapour plasma may subsequently be used for further surface modification by specific functional groups or polymers. As indicated above, this means that the whole of the surface will interact strongly with the modifying chemicals, and not just the edges, as appears to be the case without prior water vapour plasma modification (2). The surface properties of kaolinite (and other clay minerals) can thus be tailored in a controlled and reproducible manner to provide a range of hydrophilic to hydrophobic surface properties, without changing the bulk properties or morphology of the mineral.

Thus in accordance with another aspect of the invention, the plasma treatment may be optionally followed by treatment with an appropriate chemical reagent to further modify the surface properties of the mineral.

The chemical reagents that can be used to further modify the surface properties after water vapour plasma modification include those presently known for use in the modification of mineral surfaces and any other reagents capable of attachment to the modified kaolin surface. Such reagents may rely on development of surface charge on the kaolinite surface in aqueous dispersions and/or reaction with hydroxyl groups on the kaolinite surface to form chemical bonds.

These include reagents such as

1. Organosilanes
   (a) mono, di, tri chlorosilanes $R_3SiCl$, $R_2SiCl_2 R_3SiCl$ (R=any organic group)
   (b) alkoxysilanes (e.g. $RSi(OEt)_3$)
   (c) aminosilanes and mercaptosilanes (see Reference 3).
2. Monomers
   Which polymerise onto kaolinite and are attached by bonding through OH groups. See for example Reference 2 where an organic monomer, co-monomer or prepolymer is reacted on a silicate in presence of gaseous hydrogen atmosphere, or Reference 18, where a diisocyanate, an alcohol and kaolin are reacted to produce a polyurethane is attached by covalent bonding to the kaolinite, which can then be used as filler in polymers.
3. Cationic polyelectrolytes
   e.g. diallyldimethylammonium chloride, to create structure in flocculated kaolin suspensions for use as a paper coating pigment (see Ref 19).
4. Polyamines or polyamides and epichlorohydrin
   to give a water-soluble cationic filter or pigment useful in the paper industry (see Reference 20).
5. Quaternary amines
   to render the kaolinite more hydrophobic, so it can then be incorporated into inks as an extender pigment (see Reference 21).
6. Ammonia
   Amination by reacting the dry particles with gaseous $NH_3$ at temperatures below 1000° C. to form bound $NH_2$ groups at the surface then using this to react with organic monomers or co-monomers or prepolymers. (see Reference 22).

The invention also includes kaolinite or a kindred mineral having a modified surface produced by the methods defined above.

The invention is further described and illustrated by reference to the following description and non-limited examples.

Figure 1:
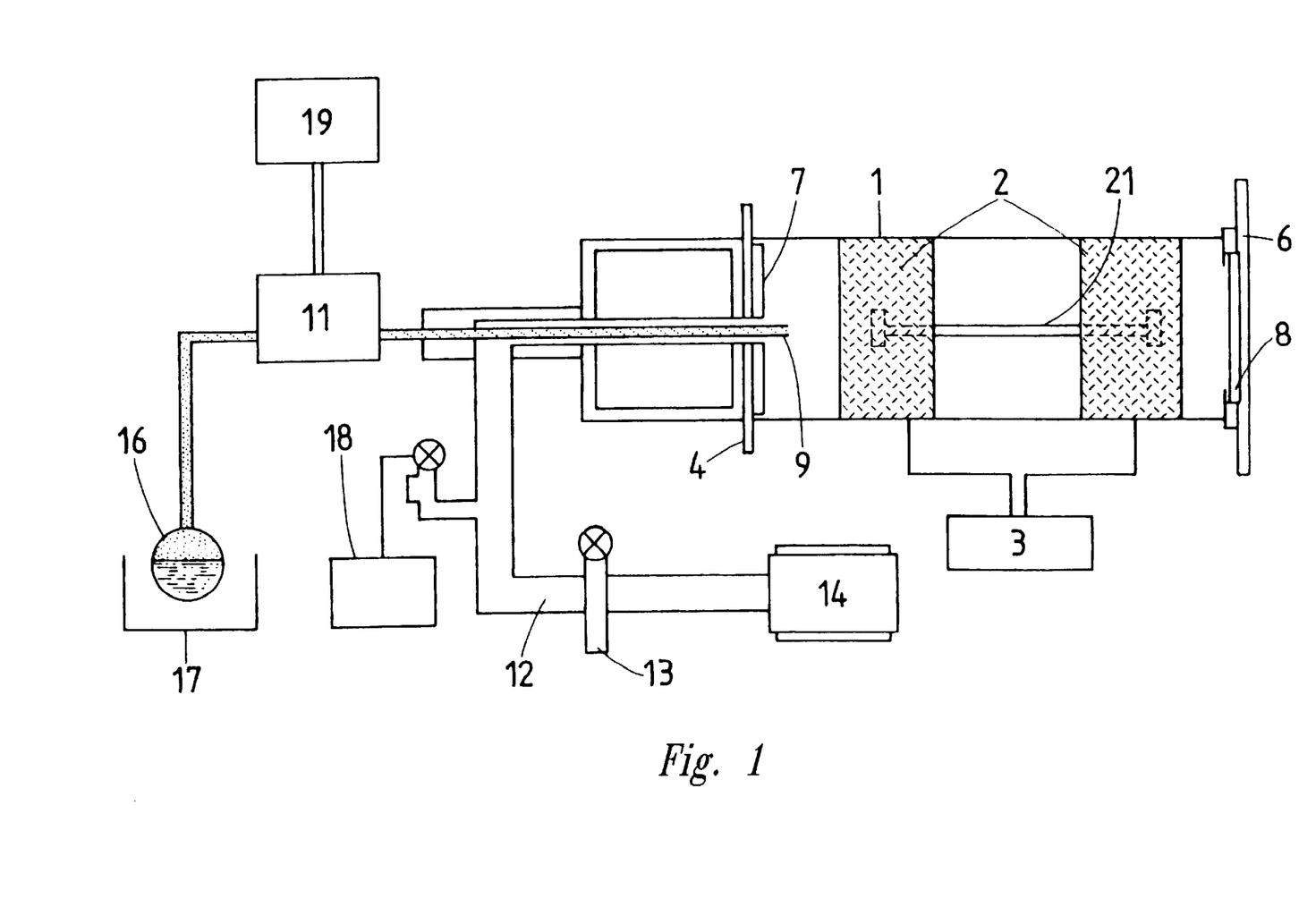
FIGS. 1 and 1a are diagrams of an apparatus for treating a mineral powder with a water vapour plasma.

As shown in FIG. 1, the reaction chamber 1 is a piece of 12 mm thick QVF Pipeline glass (Pyrex) tubing 500 mm long and 184 mm external diameter (at opening with 154 mm internal diameter in the centre of the chamber). Two cylindrical or part-cylindrical copper electrodes 2 are wrapped around the outside of the glass and connected to a custom built rf generator 3 (Vast Technologies, South Australia). The shape, position and polarity of the electrodes can be varied. The electrode configuration shown in FIG. 1 is referred to hereinafter as "Electrode A". An alternative configuration is shown in FIG. 1a and is referred to hereinafter as "Electrode B".

The chamber 1 is positioned horizontally and provided with two aluminum end plates 4, 6. One plate 4 is fixed and the other 6 is removable. O-rings are cemented to each of the end plates, so as to provide a seal during evacuation of the chamber. The fixed plate 4 has a PTFE O-ring 7 and the removable plate 6 a Viton O-ring 8. The removable end plate 6 is used as the entry port for the sample. The fixed end plate 4 carries a coaxial assembly consisting of an inner glass tube 9 for the entry of gases into the glass chamber, and an outer stainless steel tube 12, for exit of gases to a liquid nitrogen cold trap 13 which is connected to a Leybold D8B 2 stage rotary vane vacuum pump 14. A Unit Instruments UFC-1 100 A mass flow controller 11 is connected between the gas inlet tube 9 and a glass bulb 16 which contains conductivity water and is immersed in a constant temperature water bath 17. The liquid nitrogen cold trap 13 is used to trap any back streaming oil from the pump to prevent possible contamination of the plasma chamber and also to trap condensable vapors, such as water vapour, thereby preventing them from being pumped through the pump. The pressure was measured using a Leybold PG-3 Pirani vacuum gauge and sensor 18 and the flow was controlled and measured using a Unit Instruments URS-20 readout power supply 19. Hence, the flow rate of the gas into the chamber can be varied and controlled whereas the pumping speed of the pump and the pressure in the system cannot. The rf frequency and power required is set by the generator 3. The power reading of the rf generator is the measured power actually coupled to the gas inside tile chamber and not the output power of the generator (which is usually the power measured on commercial rf generators). The reaction chamber can be rotated by means of an electric motor 21, if required. However, it was found that kaolinite may then adhere to the walls of the glass chamber and cause problems, as the plasma field has a dark space at the glass surface of the reactor.

Figure 1A:
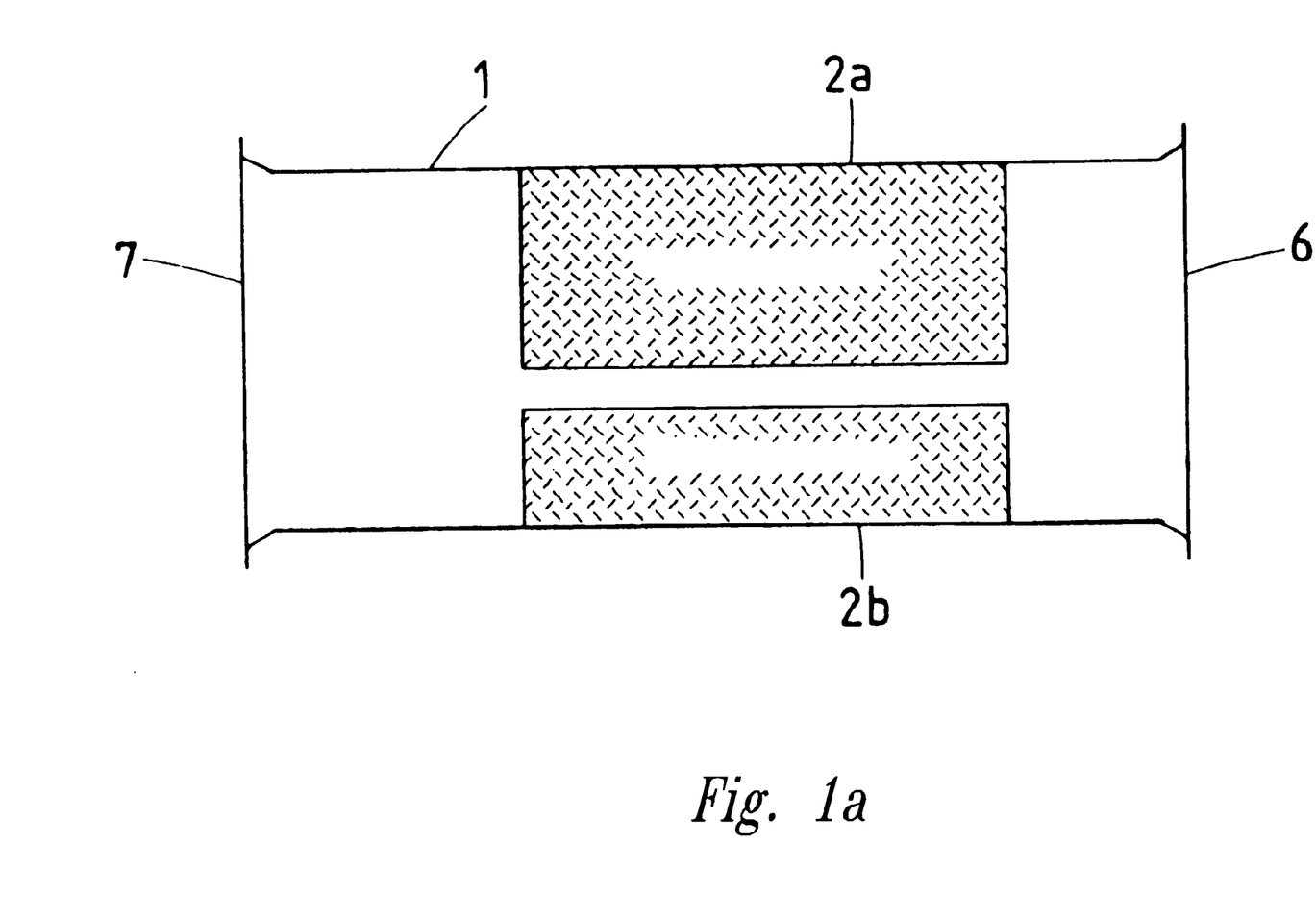

In the electrode configuration depicted in FIG. 1a, parts in common with those of FIG. 1 are similarly labelled. The copper electrodes (2a,2b) are part-cylindrical. In this instance, 2a is the active electrode and 2b the ground electrode. The glass plate (21 in FIG. 1) is not shown in FIG. 1a but is located in the same position as in FIG. 1.

In operation, the conditions used are such that the plasma glow is brightest and uniform throughout the space between the electrodes. The powder to be treated is placed on a Pyrex glass plate 21 located in the centre of the chamber between the electrodes and supported by glass rods (not shown) positioned across the circular chamber. This arrangement is considered realistic, because, on a molecular level, water molecules or any species formed from the water molecules in the gas plasma discharge will interact with all surfaces of the mineral particles. The plasma species formed are of very low molecular weight and will be able to diffuse between the particles regardless of how closely packed the individual kaolinite particles are. It was therefore thought unnecessary to move or agitate the particles. The uniformity of plasma modification was investigated in the subsequent analysis of the samples.

The following examples are intended only to further illustrate the invention and are not intended to limit the scope of the invention.

EXPERIMENTAL METHODS 8 g of kaolinite powder was spread over a glass plate and placed in the reaction chamber. The chamber was sealed and pumped down until the pressure was stable. The mass flow controller was then turned on and the pressure and flow rate were allowed to equilibrate as the water vapour was pumped through the chamber. The power and frequency of the rf generator was set and the rf generator was turned on when the flow rate and pressure were stable. After a predetermined reaction time, the rf generator was turned off and water vapour was allowed to continue to flow for thirty minutes. After this time the pump was turned off and the chamber was closed off from the pump. The water vapour was allowed to flow in until the pressure equalised and the mass flow control unit was turned off. The sample was left in the chamber in the water vapour environment for a further thirty minutes. After this time the chamber was opened and the sample removed and stored in a desiccator over silica gel.

Three water vapour plasma-reacted samples of kaolinite, ranging from a small to a large degree of plasma modification, and one sample of kaolinite that had not undergone plasma treatment at all, were subsequently reacted with an organosilane to test if the reactivity of the kaolinite had been increased in a predictable and controlled manner. 4 g of each plasma reacted sample was heated at 200° C. in a dedicated clean oven for 18 hours, cooled to room temperature, and 30 ml of a 50% v/v solution of chlorodimethyloctadecylsilane and cyclohexane was then added. The mixture was stirred for two hours in a Quick-fit conical flask with a drying tube, containing anhydrous calcium chloride, in the neck of the flask. 4 g of the sample that had not undergone prior plasma treatment was heated to 110° C. for two and half hours prior to reaction with the silane. After the reaction time the samples were filtered and dried under vacuum then washed with cyclohexane, filtered and dried under vacuum twice to remove any residual unreacted silane. The samples were subsequently dried in an oven at 110° C. overnight and then stored in a desiccator over silica gel.

RESULTS

Infrared Spectroscopy

Diffuse reflectance infrared spectroscopy was used to analyse the samples. For the infrared analysis of the plasma reacted particles, at least three samples were taken from each 8 g plasma-reacted sample to test the uniformity of the water vapour plasma modification throughout the 8 g sample as well as to determine the error associated with the infrared analysis.

The extent of plasma modification was determined from infrared spectroscopy as a function of power, flow rate of water vapour, time reacted with the plasma gas, frequency, electrode configuration, temperature of the water vapour and position of the sample along the glass plate.

The conditions under which the samples were water vapour plasma reacted and the extent of modification, expressed as "Absorbance of the peak at 1400 $cm^{-1}$", are shown in Table 1.

Figure 2A:
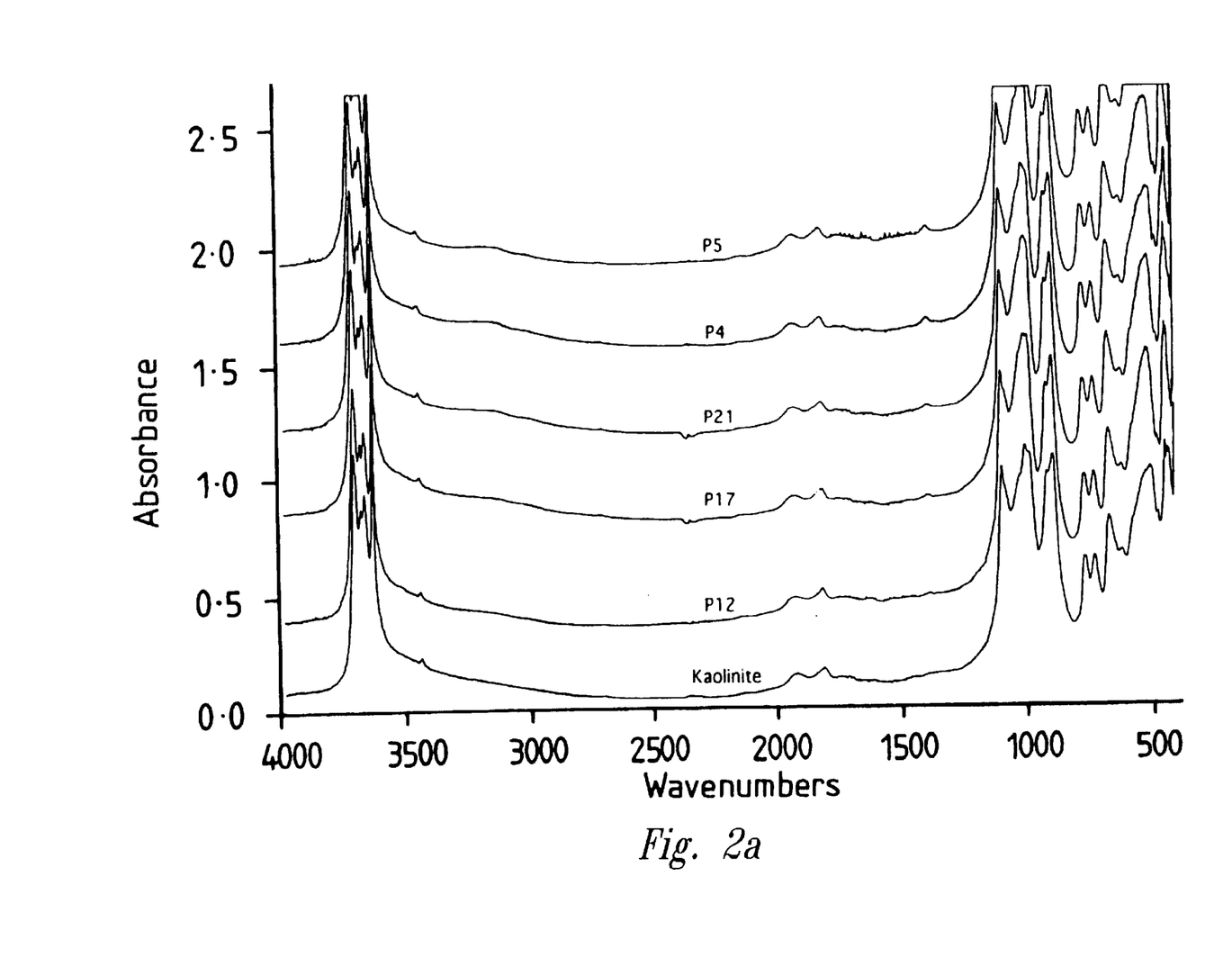
FIGS. 2(a), (b) and (c) show the infrared spectra of water vapour plasma modified kaolinite samples compared with kaolinite that had not undergone plasma modification.
Figure 2B:
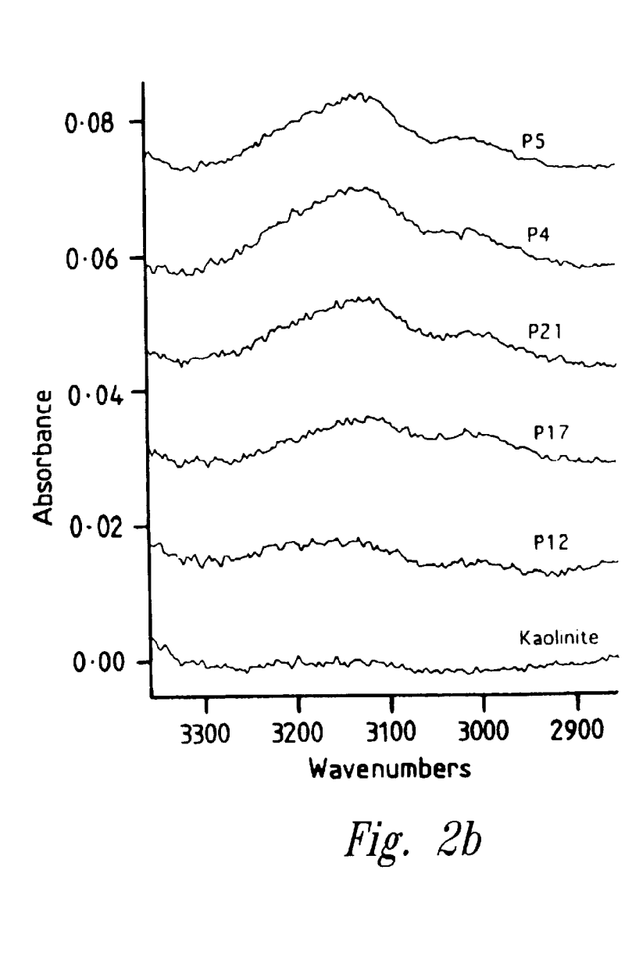
Figure 2C:
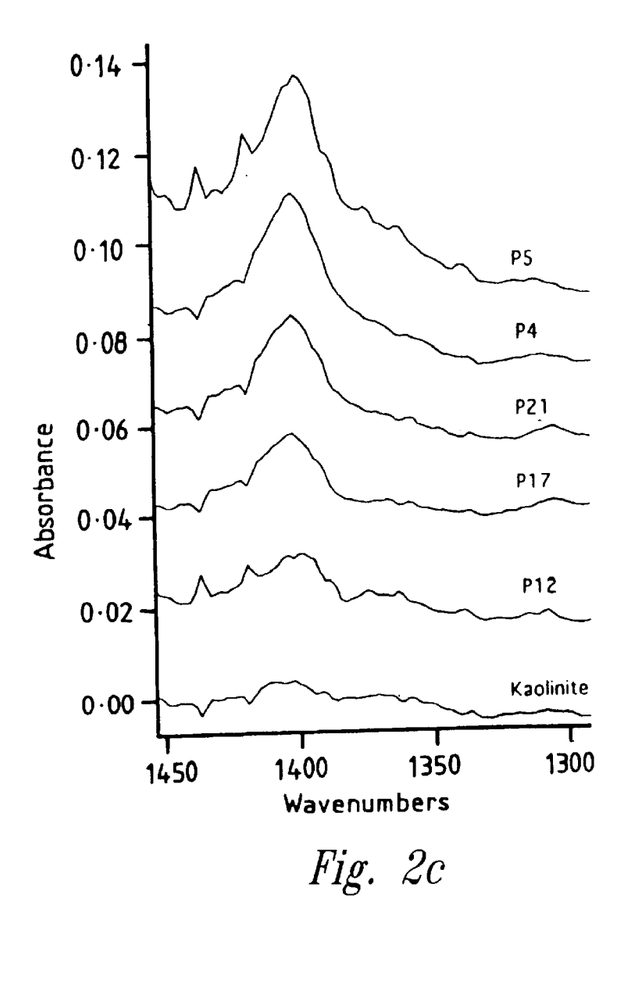

FIG. 2(a) shows the infrared spectra of water vapour plasma modified kaolinite samples, P12, P17, P21, P4 and P5 compared to kaolinite that had not undergone plasma modification. New peaks appear at 1400, 3010 and 3100 $cm^{-1}$ in the plasma modified samples spectra. Enlargements of these peaks are shown in FIGS. 2(b) and 2(c). Note the increase in the height of these peaks from sample P12 to P5.

The absorbance of the peak at 1400 cm$^{-1}$ was determined for each sample reacted and results listed in Table 1. An increase in the height of this peak at 1400 cm$^{-1}$ is an indication of an increase in the extent of modification by the water vapour plasma. This is supported by the electrophoresis and contact angle data presented below.

Infrared spectra of three separate samples from each 8 g sample of kaolinite were obtained and the absorbances of the peaks at 1400 cm$^{-1}$ were determined. The absorbances were reproducible between the three samples and the average error in Absorbance was calculated to be ±0.0015 (95% confidence), indicating that the kaolinite particles were uniformly modified throughout the sample thereby demonstrating that it was not necessary to move or agitate the particles. Table 1 lists the average absorbance ±0.0015 for each 8 g sample.

Samples P4A and P4B were taken from the centre and the end of the glass plate respectively of the same 8 g sample in order to determine if the position on the glass plate affected the extent of the modification. There is no significant difference between these two samples indicating that the particles are uniformly modified along the glass plate.

Samples P39 and P34 were different 8 g samples of kaolinite plasma modified under the same conditions to determine if the extent of modification under controlled conditions is reproducible. The results indicate that the extent of modification under controlled conditions is reproducible.

Samples P4, P5 and P6 were samples run at a water bath temperature of 39° C. These samples produced surfaces with a greater extent of modification compared to the samples run under the same conditions at 25° C., indicating that increasing the temperature of the gas in the plasma increases the extent of modification.

Other infrared studies showed that the peaks at 1400, 3010 and 3100 cm$^{-1}$ do not decrease when the particles are heated overnight at a temperature of 250° C., but do disappear when reacted with silane, indicating that these peaks could be due to an increased number of hydroxyl groups incorporated into the basal planes.

FIGS. 3, 4, 5 and 6 show the extent of modification (as measured by absorbance of IR peak at 1400 cm$^{-1}$) as a function of the various conditions controlled.

Figure 3:
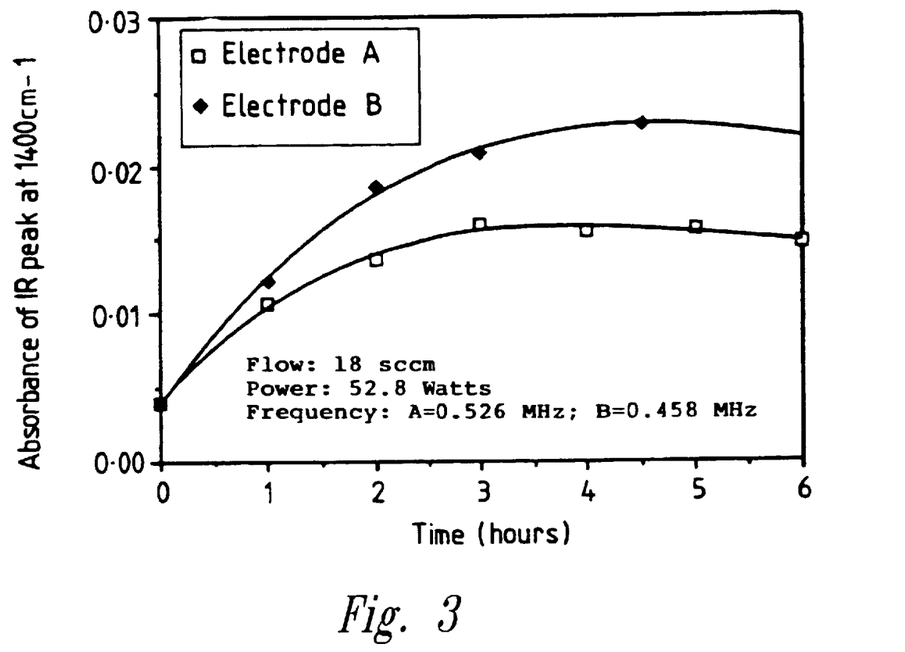
FIGS. 3, 4, 5 and 6 show the extent of modification (as measured by absorbance of IR peak at $1400\ cm^{-1}$) as a function of the various process conditions.

FIG. 3 indicates that both the time and electrode configuration affect the extent of modification. The extent of modification increases with time to an optimum value occurring at 3 hours for Electrode A configuration (FIG. 1), but continues to increase for Electrode B configuration (FIG. 1 a). Electrode B configuration produced the larger extent of modification at all conditions.

Figure 4:
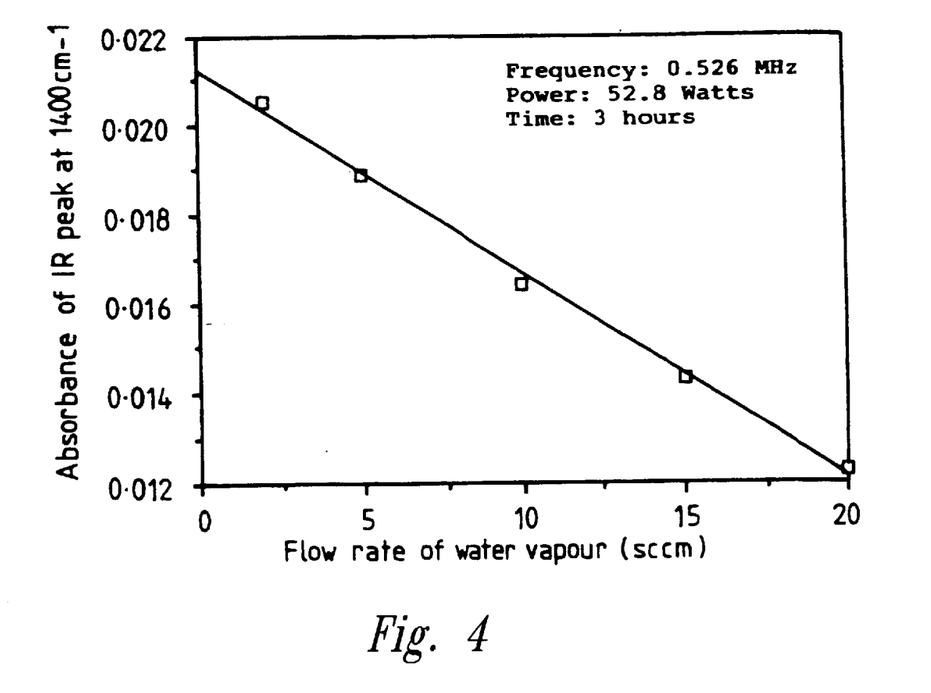

FIG. 4 indicates that as the flow rate of the water vapour decreases under the controlled conditions applied, the extent of the modification increases.

Figure 5:
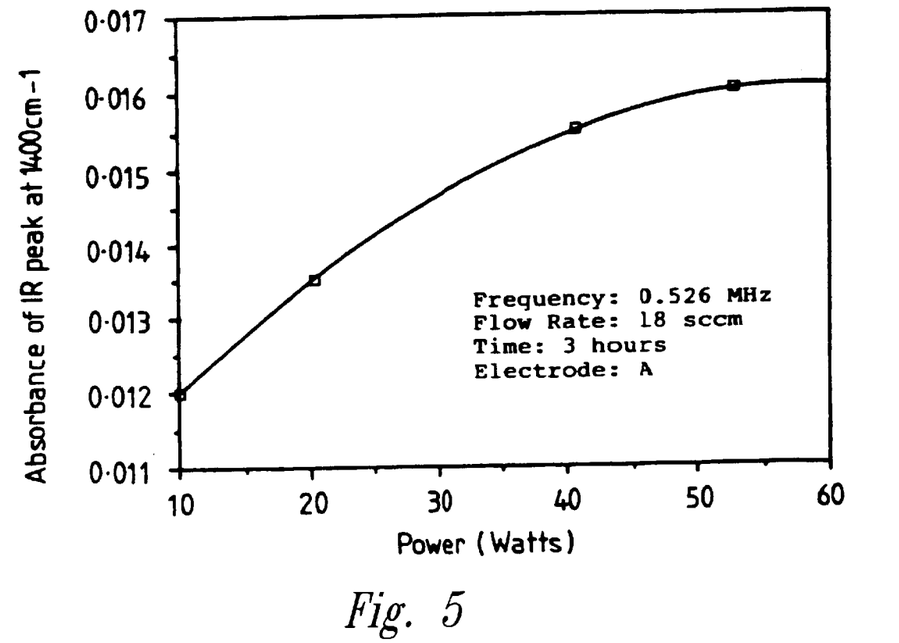

FIG. 5 indicates that as the power increases under the controlled conditions applied, the extent of the modification increases.

Figure 6:
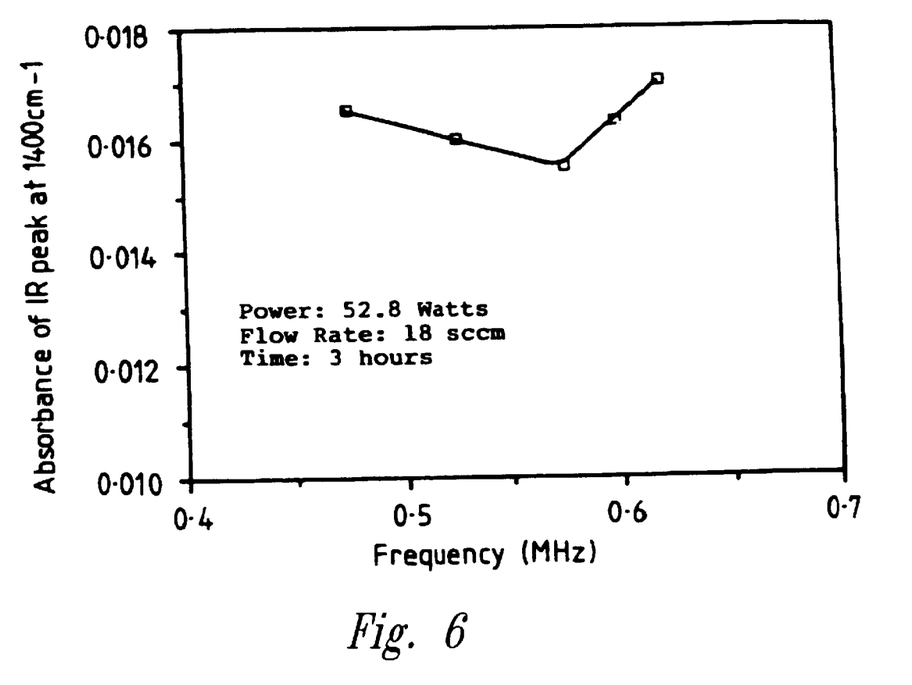
Figure 7:
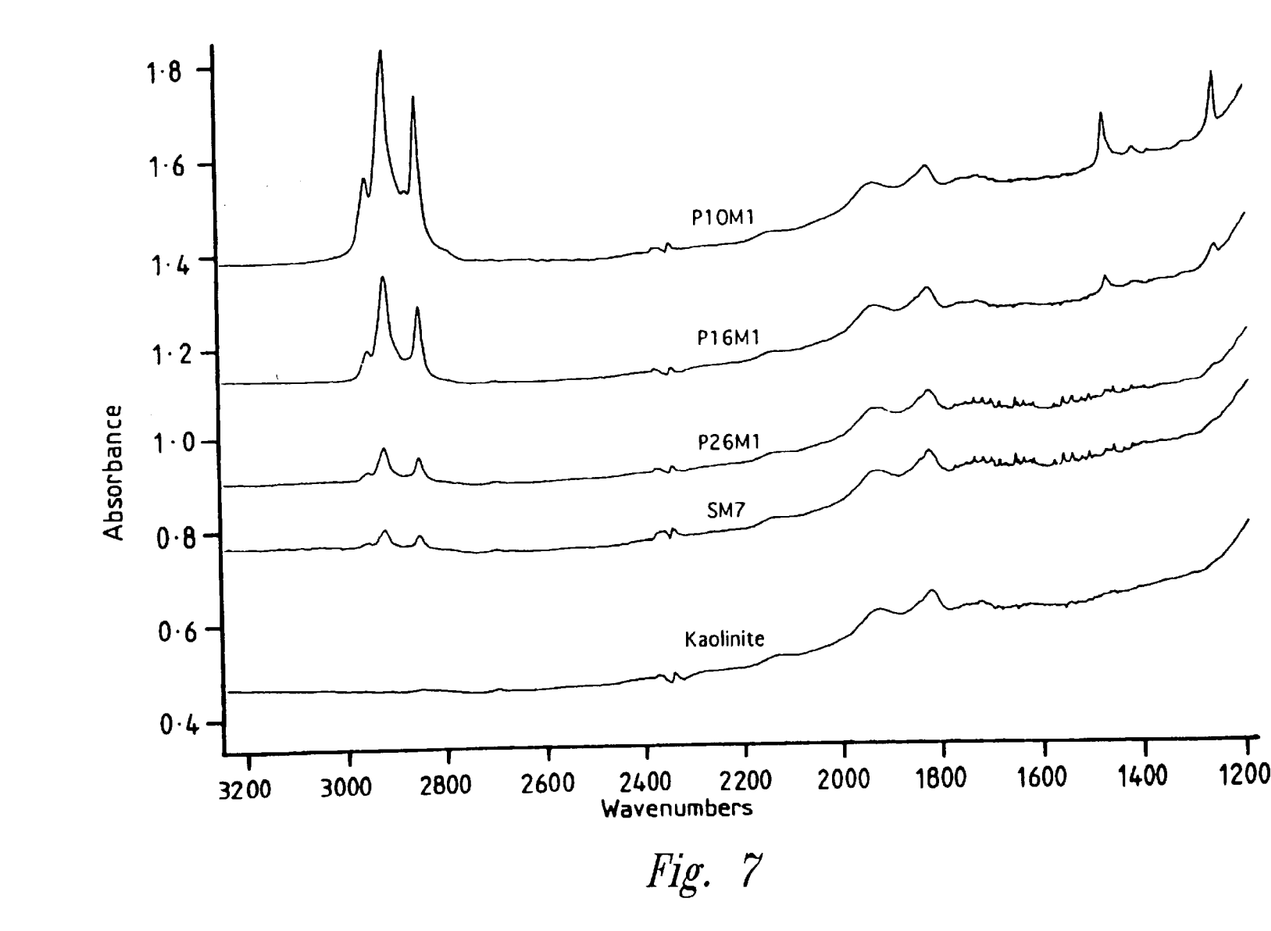
FIG. 7 shows infrared spectra of samples of water vapour plasma modified kaolinite followed by reaction with the organosilanes compared to kaolinite not modified by water vapour plasma prior to reaction with a silane.

FIG. 6 indicates that at the controlled conditions applied, the frequency has only a small influence on the extent of modification. FIG. 7 shows infrared spectra of samples of water vapour plasma modified kaolinite followed by reaction with the organosilanes P26M1, P16M1 and P1OM1 compared to kaolinite not modified by water vapour plasma prior to reaction with the silane SM7. The C-H stretch peaks of the methyl and methylene peaks in region 2700 to 2950 cm$^{-1}$ and the C-H deformation peaks in the region 1300 to 1400 cm$^{-1}$ increase with increase in the extent of water vapour plasma modification. Prior to silane modification, the SM7 sample shows the greatest extent of modification achievable without prior plasma modification. Thus the number of reactive hydroxyl groups on the surface of kaolinite can be increased enormously, and in a controlled manner, by surface modification with a water vapour plasma.

Electrophoresis (surface charge) and Contact Angle

Electrophoresis (surface charge) and contact angle data provided further evidence, not only of the extent, but also of the location of surface modification by a water vapour plasma. These data show how the surface properties of kaolinite have been tailored to provide a range of hydrophilic to hydrophobic properties, with the surface being made reactive over the entire surface of the particles, i.e, including the basal faces rather than just the edges.

Table 2 shows the contact angles of various kaolinite samples. There is a decrease in contact angle with extent of water vapour plasma modification and an increase in contact angle when these samples are further modified with the silane. This is further evidence for an increase in the number of reactive hydroxyl groups over the entire surface of kaolinite. Note that the sample SM7 has a high contact angle, indicating that its surface contains hydrophobic groups, yet it still disperses in water. This indicates that only a part of the surface has been modified with the hydrophobic silane group, the edges, with still part of the surface remaining hydrophilic, the basal planes. These results are evidence of being able to tailor the surface to provide the properties required by a combination of water vapour plasma modification and subsequent modification with other reagents.

Figure 8:
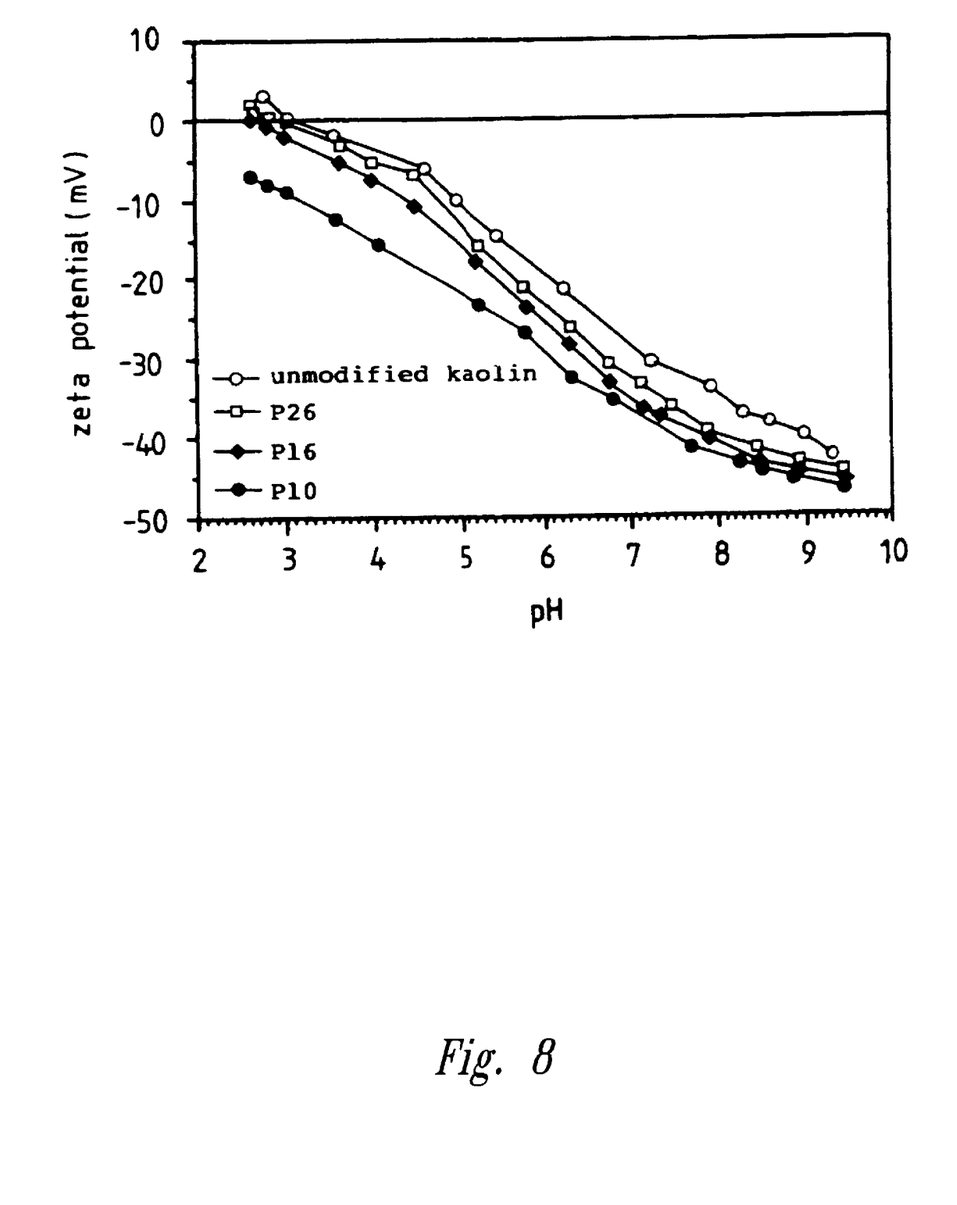
FIG. 8 shows the results of electrophoresis measurements on various kaolinite samples.

FIG. 8 shows the results of electrophoresis measurements on various kaolinlte samples. Electrophoresis is an indication of the charge developed in aqueous solutions as a function of pH and electrolyte concentration. As the extent of water vapour plasma modification increases, charge development increases which is an indication of the increase in the number of reactive hydroxyl groups on the surface.

Surface Area (BET) and Scanning Electron Microscopy (SEM)

Bulk properties such as morphology and surface area have been shown (by Brunauer, Emmett and Teller (BET) N2 surface area determinations and SEM) not to alter upon surface modification of the kaolinite.

The surface area of the kaolinite was determined before and after plasma modification (Sample P6). There was no detectable change in the measured surface area of 15.3±0.5 m2 g-1.

Figure 9A:
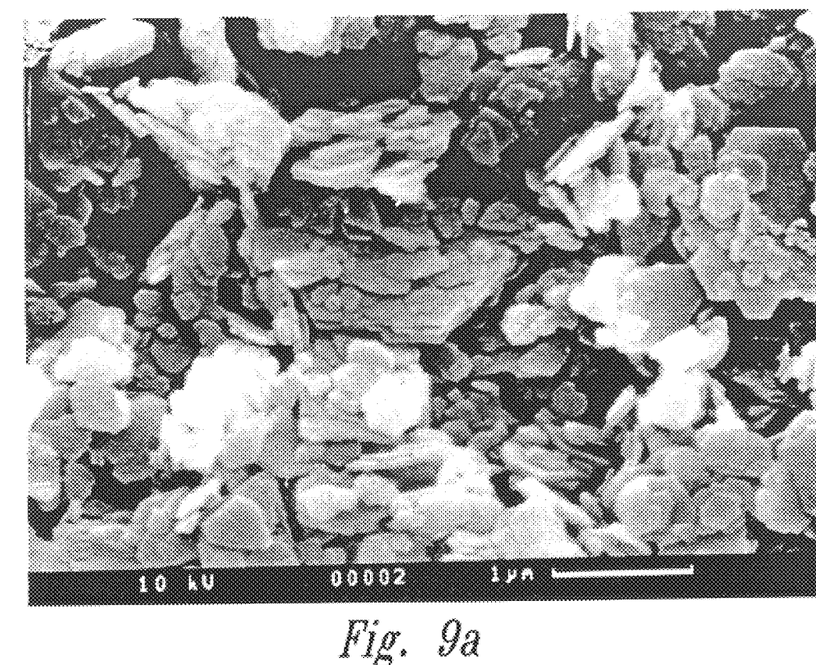
FIG. 9 shows scanning electron microscope photographs of untreated kaolinite (a,b) compared with a sample that had undergone plasma treatment (c,d).
Figure 9B:
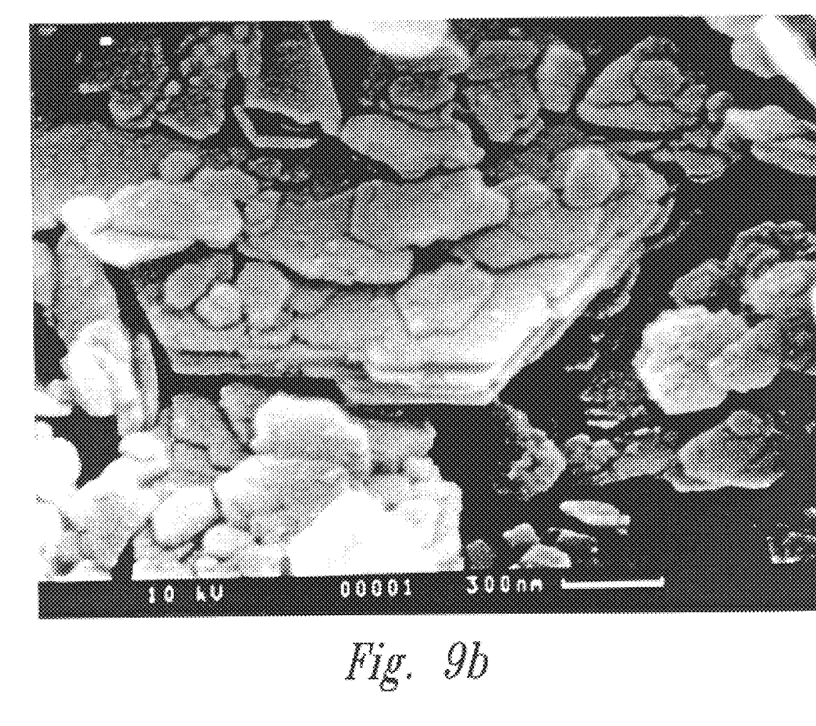
Figure 9C:
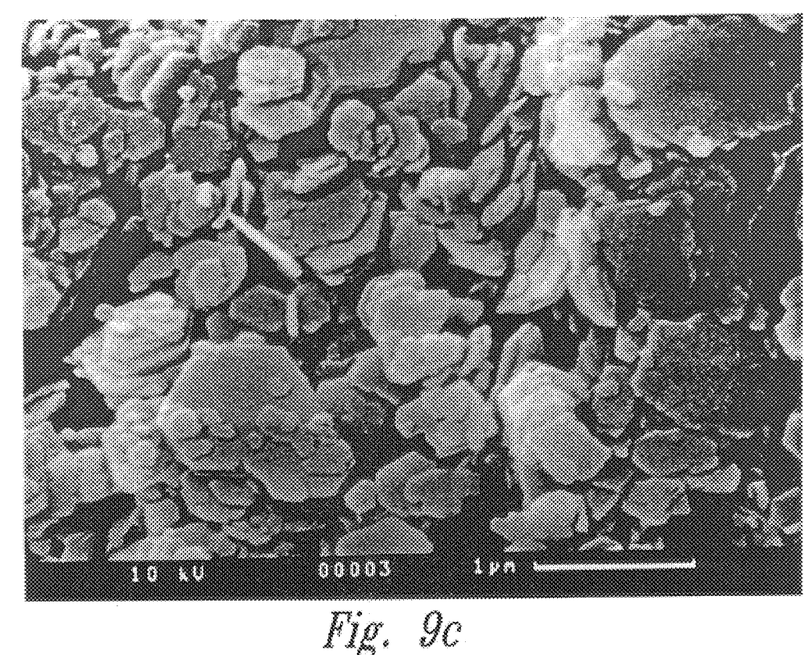
Figure 9D:
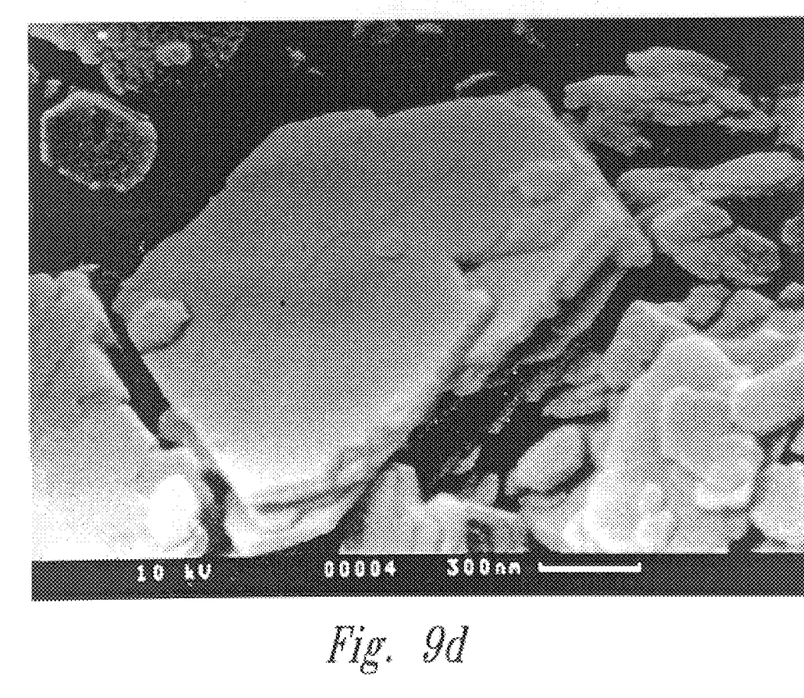

FIGS. 9(a) and (b) are scanning electron microscope photographs of kaolinite that had not undergone plasma treatment compared to a sample (FIGS. 9(c) and (d)) that had undergone plasma treatment (P6). There is no observable change in the morphology.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

REFERENCES

1. Rausell-Colom, J. and Serratosa, J. in *Chemistry of clays and clay minerals*, A. C. D. Newman, ed., Mineralogical Society Monograph No. 6, WileyInterscience, New York, 412–415 (1987).
2. Rice, C. A., U.S. Pat. No: 4,789,403
3. Ianicelli, J. et al, U.S. Pat. No: 3,567,680
4. Rice, C. A., U.S. Pat. No: 4,798,766
5. Jepson, W. B., *Phil. Trans. R.Soc. Lond.* 311, 411 (1984).
6. Wierer, K. and Dobias, B., *J. J. Colloid Interface Sci.* 122, 171 (1988).
7. Sekutowski, D., *Plastics Engineering* 43.(August 1987).
8. Cai, S., Ji, G., Fang, J., and Xue, G. *Angew. Makromol. Chem.* 179, 77 (1990).
9. Denoyel, R. and Rouquerol, J., *J. Colloid Interface Sci.* 143, 555 (1991).
10. Cho, D., Claesson, Per M., Golander, C. and Johansson, K. *J. Appl. Polym.Sci.* 41, 1373 (1990).
11. Rossnagel, S. in *Thin film processes* 11, J. Vossen and W. Kern, eds., Academic Press, San Diego, 34–35 (1991).
12. Schreiber, H. P., Wertheimer, M. R. and Sridharan, A. U. *ACS Symposium Ser.*, 108, Plasma Polym., 287–298 (1979).
13. Bialski, A, Manley, R. St. J., Wertheimer, M. R. and Schreiber, H. P. *Polym. Prepr., Am. Chem. Soc., Div. Polym. Chem.*, 16, 70–2 (1975).
14. Schreiber, H. P. and Germain, F. St. J. *Adhesion Sci. Technol.* 4, 319 (1990).
15. Kiss, E. and Gölander, C-G. *Colloids and Surfaces* 49, 335 (1990).
16. Tsutsui, K., Nishizawa, K. and Ikeda, S. *Journal of Coatings Technology* 60, 107 (1988).
17. Claesson, P., Cho, D., Gölander, C., Kiss, E. and Parker, J. *Progr. Colloid Polym. Sci.* 82, 330 (1990).
18. Laslett, R., Wansbrough, E., Singhm, S., Rizzardo, E., and Mainwaring, D., *Polymer International* 28 (1922) 19–23.
19. Slepetys, R. A., and Morgan, L. J., *Tappi Journal*, (January 1991), 195.
20. European Patent No. 0 491 346 A1 (1991)
21. Durham, D., U.S. Pat. No. 5,137,568,
22. Rice, C. A., U.S. Pat. No. 4,798,766,

TABLE 1

CONDITIONS USED FOR WATER VAPOUR PLASMA MODIFICATION OF KAOLINITE AND THE EXTENT OF MODIFICATION AS DETERMINED BY THE ABSORBANCE OF THE PEAK AT 1400 cm$^{-1}$

| Sample | Water Bath Temp. (° C.) | Electrode | Frequency (Mhz) | Power (Watts) | Flow (sccm) | Time (hours) | Pressure (Torr) | Absorbance of peak at 1400 cm$^{-1}$ (±0.0015) |
|---|---|---|---|---|---|---|---|---|
| kaolinite | | | | | | | | 0.0040 |
| P12 | 25 | A | 0.526 | 52.8 | 18 | 1.0 | 0.33 | 0.0107 |
| P13 | 25 | A | 0.526 | 52.8 | 18 | 2.0 | 0.30 | 0.0137 |
| P14 | 25 | A | 0.526 | 52.8 | 18 | 3.0 | 0.27 | 0.0160 |
| P15 | 25 | A | 0.526 | 52.8 | 18 | 4.0 | 0.31 | 0.0156 |
| P16 | 25 | A | 0.526 | 52.8 | 18 | 5.0 | 0.32 | 0.0157 |
| P17 | 25 | A | 0.526 | 52.8 | 18 | 6.0 | 0.30 | 0.0149 |
| P18 | 25 | A | 0.526 | 52.8 | 20 | 3.0 | 0.32 | 0.0123 |
| P14 | 25 | A | 0.526 | 52.8 | 18 | 3.0 | 0.27 | 0.0160 |
| P19 | 25 | A | 0.526 | 52.8 | 15 | 3.0 | 0.28 | 0.0143 |
| P20 | 25 | A | 0.526 | 52.8 | 10 | 3.0 | 0.18 | 0.0164 |
| P21 | 25 | A | 0.526 | 52.8 | 5 | 3.0 | 0.19 | 0.0189 |
| P22 | 25 | A | 0.526 | 52.8 | 2 | 3.0 | 0.14 | 0.0205 |
| P14 | 25 | A | 0.526 | 52.8 | 18 | 3.0 | 0.27 | 0.0160 |
| P23 | 25 | A | 0.526 | 40.8 | 18 | 3.0 | 0.27 | 0.0155 |
| P24 | 25 | A | 0.526 | 30.6 | 18 | 3.0 | 0.31 | 0.0131 |
| P25 | 25 | A | 0.526 | 20.5 | 18 | 3.0 | 0.31 | 0.0135 |
| P26 | 25 | A | 0.526 | 10.2 | 18 | 3.0 | 0.25 | 0.0120 |
| P27 | 25 | A | 0.475 | 52.8 | 18 | 3.0 | 0.31 | 0.0165 |
| P14 | 25 | A | 0.526 | 52.8 | 18 | 3.0 | 0.27 | 0.0160 |
| P28 | 25 | A | 0.575 | 52.8 | 18 | 3.0 | 0.25 | 0.0155 |
| P29 | 25 | A | 0.600 | 52.8 | 18 | 3.0 | 0.30 | 0.0163 |
| P30 | 25 | A | 0.620 | 52.4 | 18 | 3.0 | 0.34 | 0.0170 |
| P8 | 25 | B | 0.458 | 52.8 | 18 | 1.0 | 0.38 | 0.0122 |
| P40 | 25 | B | 0.458 | 52.8 | 18 | 2.0 | 0.22 | 0.0188 |
| P36 | 25 | B | 0.458 | 52.8 | 18 | 3.0 | 0.54 | 0.0211 |
| P10 | 25 | B | 0.458 | 52.8 | 18 | 4.5 | 0.34 | 0.0229 |
| P39 | 25 | B | 0.458 | 52.8 | 2 | 3.0 | 0.16 | 0.0194 |
| P34 | 25 | B | 0.458 | 52.8 | 2 | 3.0 | 0.17 | 0.0199 |
| P4A | 39 | A | 0.525 | 51.4 | 18 | 4.5 | 0.37 | 0.0233 |
| P4B | 39 | A | 0.525 | 51.4 | 18 | 4.5 | 0.37 | 0.0240 |
| P5 | 39 | A | 0.525 | 51.3 | 18 | 5.5 | 0.24 | 0.0249 |
| P6 | 39 | A | 0.525 | 50.5 | 18 | 6.0 | 0.31 | 0.0209 |

TABLE 2

CONTACT ANGLES OF KAOLINITE SAMPLES

| SAMPLE | Extent of plasma modification as measured by Absorbance of peak at 1400 cm$^{-1}$ (±0.0015) | Contact Angle (±2°) | Dispersion in water |
|---|---|---|---|
| kaolinite | — | 61° | dispersed readily |
| P26 | 0.0120 | 49° | dispersed readily |
| P16 | 0.0157 | 23° | dispersed readily |
| P10 | 0.0229 | 0° | dispersed readily |
| *SM7 | — | 86° | dispersed readily |
| **P26M1 | — | 89° | no dispersion |
| **P16M1 | — | ≧90° | no dispersion |
| **P10M1 | — | ≧90° | no dispersion |

*SM7:kaolinite not plasma modified but modified with silane.
**P26M1, P16M1, P10M1:plasma modified samples P26, P16, and P10 subsequently modified with silane.

We claim:

1. A method for modifying surface properties of kaolinite or a kindred mineral, comprising the step of treating the kaolinite or kindred mineral with a water vapor plasma to generate reactive hydroxyl groups on the surface of the treated kaolinite or treated kindred mineral.

2. The method of claim 1 further comprising the step of treating the treated kaolinite or treated kindred mineral with a chemical reagent reactive with said hydroxyl groups, to further modify the surface properties of the kaolinite or kindred mineral.

3. The method of claim 2 wherein the chemical reagent is selected from the group consisting of organosilanes, monomers which are capable of polymerising onto kaolinite or kindred mineral and becoming attached thereto by bonding through OH groups, cationic polyelectrolytes, polyamines, polyamides, epichlorohydrin, quaternary amines, and ammonia.

4. Kaolinite or a kindred mineral having a modified surface that contains additional reactive hydroxyl sites.

5. The kaolinite or a kindred mineral of claim 4 wherein the surface is further modified by treating the additional reactive hydroxyl sites with a chemical reagent reactive with the additional reactive hydroxyl sites.

6. A treated kaolinite or a treated kindred mineral prepared by the method of claim 1.

7. A treated kaolinite or a treated kindred mineral prepared by the method of claim 2.

8. A treated kaolinite or a treated kindred mineral prepared by the method of claim 3.

* * * * *